May 9, 1967 A. E. TIMPERLEY 3,318,255
ROTATING CHAMBER MECHANISM
Filed July 29, 1964 5 Sheets-Sheet 1

INVENTOR.
ALFRED E. TIMPERLEY
BY
*Barlow & Barlow*
ATTORNEYS

May 9, 1967 A. E. TIMPERLEY 3,318,255
ROTATING CHAMBER MECHANISM
Filed July 29, 1964 5 Sheets-Sheet 2

INVENTOR.
ALFRED E. TIMPERLEY
BY
Barlow & Barlow
ATTORNEYS

May 9, 1967  A. E. TIMPERLEY  3,318,255
ROTATING CHAMBER MECHANISM
Filed July 29, 1964  5 Sheets-Sheet 4

INVENTOR.
ALFRED E. TIMPERLEY
BY
Barlow & Barlow
ATTORNEYS

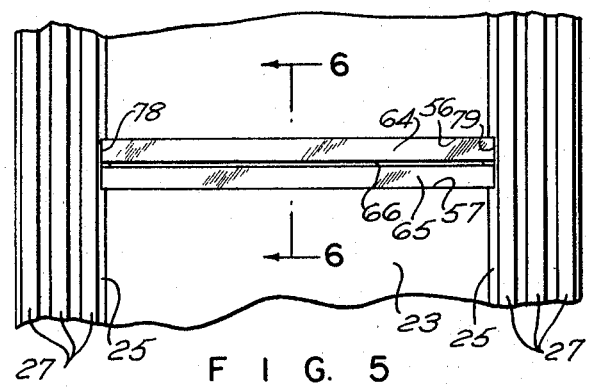
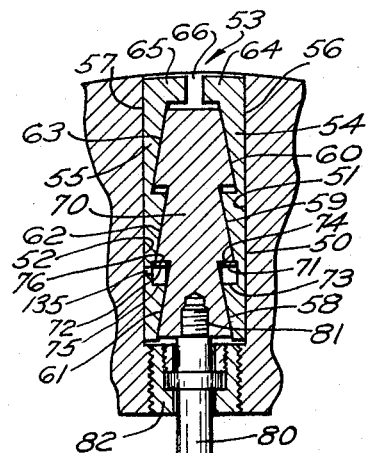
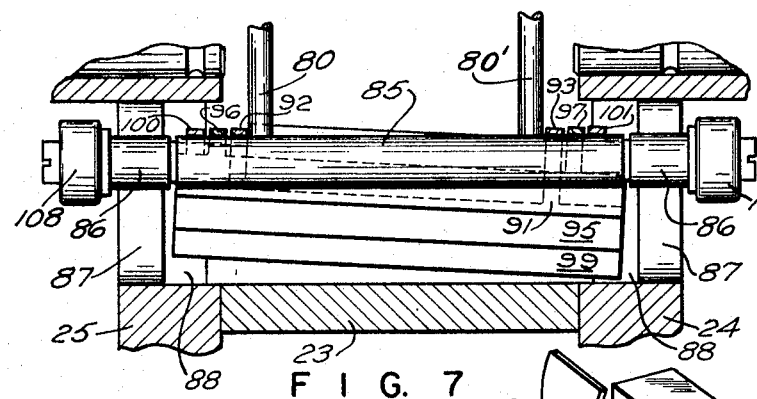
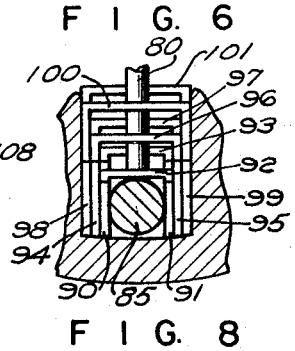
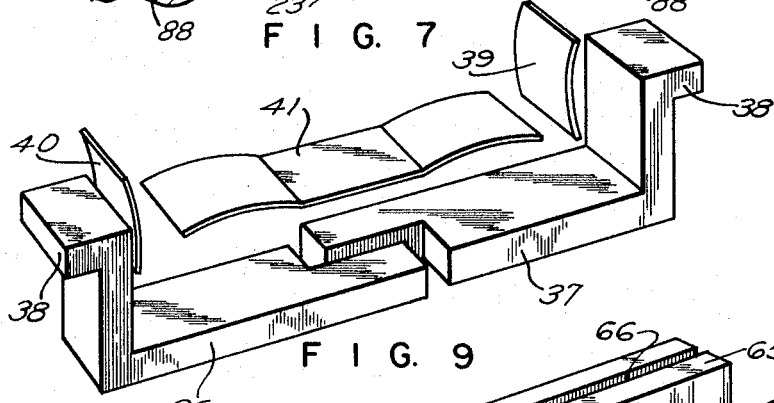
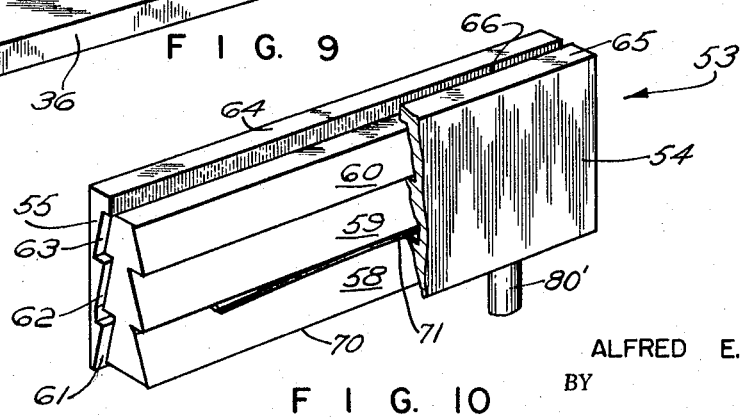
INVENTOR.
ALFRED E. TIMPERLEY
BY
Barlow & Barlow
ATTORNEYS United States Patent Office 3,318,255
Patented May 9, 1967

3,318,255
ROTATING CHAMBER MECHANISM
Alfred E. Timperley, 170 Zinnia Drive,
Cranston, R.I. 02910
Filed July 29, 1964, Ser. No. 385,959
9 Claims. (Cl. 103—135)

This invention relates to a rotating chamber mechanism such as might be used for an air compressor, vacuum pump, steam engine or an internal combustion engine.

Rotary engines have been known for some time and their theoretical advantages over reciprocating engines have also been known and yet the rotary engine is not in as general use as the reciprocating engine. One of the reasons for this lack of general use is the inability of the rotary engine to seal gases at high pressures and temperatures.

One of the objects of this invention is to provide a rotary mechanism in which an improved seal is provided for gases at high pressure and temperatures.

Another object of the invention is to eliminate the need in prior mechanisms of this character to seal the gate of the annular chamber on three sides of the stator and to instead require that the seal be maintained between the gate and the cylindrical surface of the stator on only one side.

Another object of the invention is to provide gates an arrangement of which need not seal at the same time that it is being retracted or extended.

Another object of the invention is to utilize some of the compressed gas to counteract the tendency of the compressed gas to move the gate prematurely into retracted position.

Another object of the invention is to provide for forced cooling air inside of the rotor that works on the principle of a centrifugal force compressor.

Another object of the invention is to provide a rotating chamber in which the side walls of the chamber move with the chamber.

Another object of the invention is to provide a centrifugal force balancing mechanism that works integral with the gate retracting mechanism so that at all speeds the centrifugal force on the gate is nil and the only force required to retract the gate is the force required to wind the torsion spring plus the small amount of friction involved.

With these and other objects in view, the invention consists of certain novel features of construction as will be more fully described and particularly pointed out in the appended claims.

In the accompanying drawings:

FIG. 5 is a plan view of a portion of the rotor illustrating the top of the gate;

FIG. 6 is a section on line 6—6 of FIG. 5;

FIG. 7 is a fragmental sectional view illustrating the weights which are picked up for balancing the centrifugal force on the gate;

FIG. 8 is a sectional view of the parts shown in FIG. 7 but in retracted position;

FIG. 9 is a perspective view of a seal for the divider or partition; and

FIG. 10 is a perspective of parts of the gate.

Figure 2:
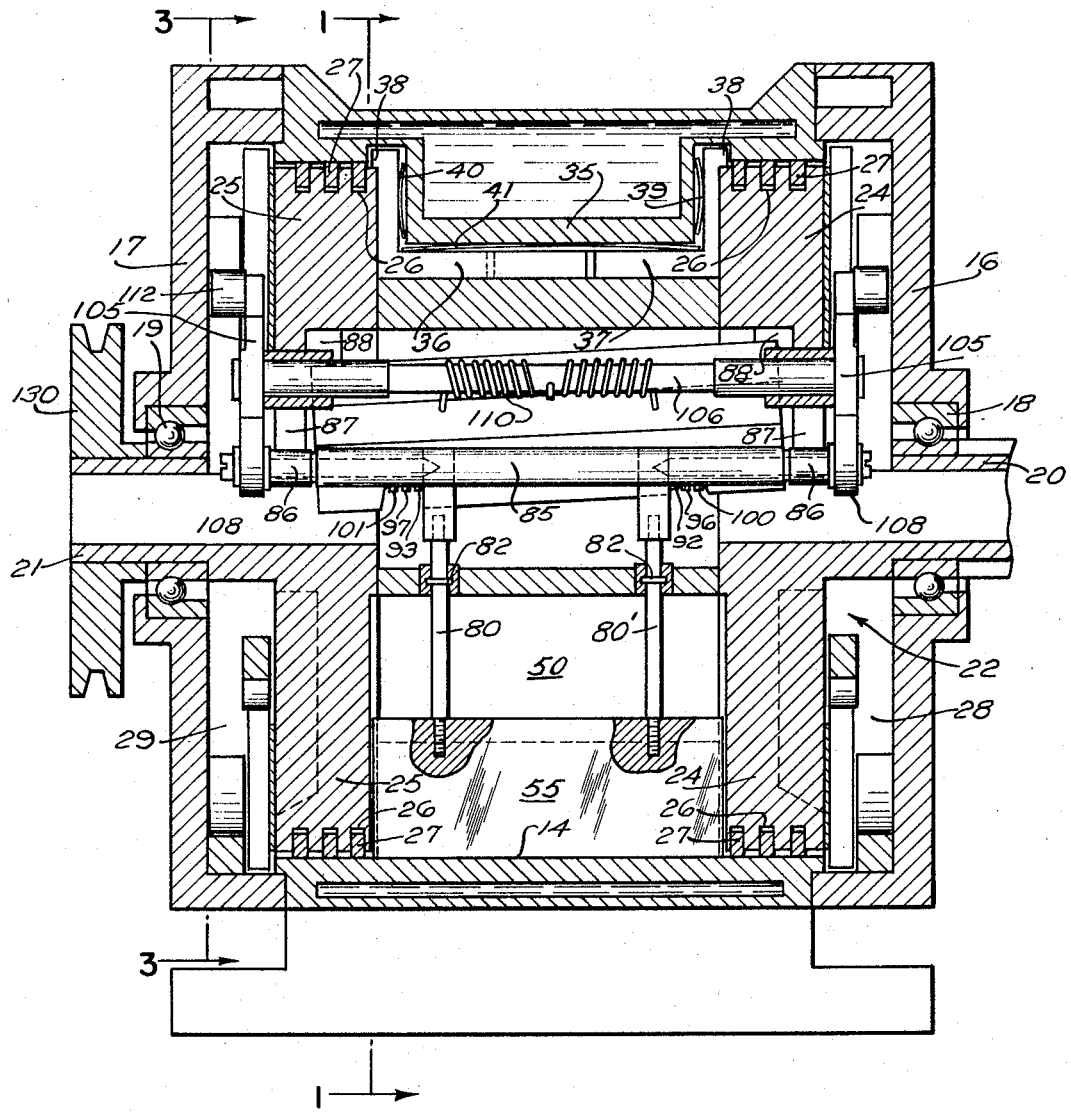
FIG. 2 is a sectional view on substantially the zigzag line 2—2 of FIG. 1.

With reference to the drawings which show an air compressor, 10 designates generally a casing which serves as a stator, having an outer circular wall 11 with water cooling ducts 12 and a cylindrical inner surface 14 forming the outer wall of an annular chamber 15. The casing also has end walls 16 and 17 which have ball bearings 18 and 19 for rotatably mounting shafts 20 and 21 which support a rotor designated generally 22 (FIG. 2).

The rotor 22 has a cylindrical body portion or wall 23 (FIG. 1) spaced from the cylindrical surface 14 of the casing and also has end walls 24 and 25 of a radial extent greater than the body portion 23, which walls 23, 24 and 25 serve to complete with the inner surface 14 of the casing a generally cylindrical or annular chamber 15, three walls of which rotate. The end walls 24 and 25 are provided with annular grooves 26 which receives sealing rings 27 to engage the surface of the casing 14 and provide a seal therewith. The end walls 24 and 25 are spaced axially inwardly from the end walls 16 and 17 of the casing to provide areas 28 and 29 in which the gate operating mechanism is located.

An intake opening 33 extends through the casing wall 11 and an output opening 34 also extends through the casing wall 11 from the annular chamber 15. A dividing wall 35 projects inwardly into the annular chamber 15 from the casing wall 11 at a point between the inlet and outlet openings. Z-shaped sealers 36 and 37 (see FIG. 9) have lips 38 which extend over the edges of the rotor end walls to the first ring and are urged by springs 39 and 40 outwardly in opposite directions against the surface of the end walls of the rotor and are urged by spring 41 downwardly or away from the dividing wall 35.

Figure 1:
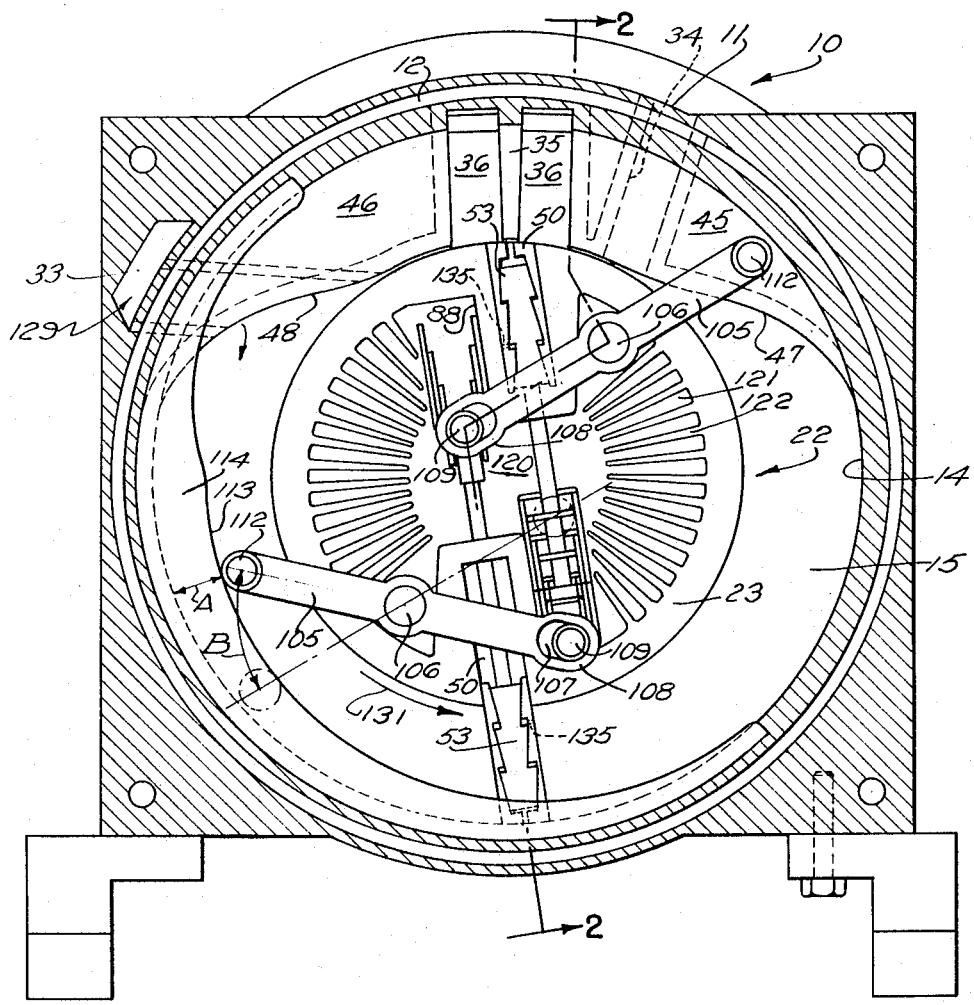
FIG. 1 is a sectional view on substantially line 1—1 of FIG. 2 with the gate operating mechanism added.

Blocks 45 and 46 having cam shaped surfaces 47 and 48 extend on either side of the dividing wall and sealer as best shown in FIG. 1. It will also be apparent that the intake and output openings 33 and 34 extend through these blocks.

The rotor 22 has its body portion 23 slotted as at 50 from its outer peripheral surface inwardly at two locations, as seen in FIG. 1, 180° apart. This rotor has substantial axial extent and these slots 50 extend throughout the axial extent of the rotor, thus providing opposite flat side walls 51 and 52 (see FIG. 6) for the guiding of gates designated generally 53 which are located in these slots and may be slid inwardly and outwardly of the rotor.

Each gate 53 comprises three sections, an inner or intermediate section 70 and two side sections 54 and 55 with outer smooth surfaces 56 and 57 to slide along the flat surfaces 51 and 52 of the slot 50. The inner section 70 is shaped like a series of wedges in a stepped formation, while the inner surfaces of the outer sections are inclined with reference to the outer surfaces in a mating step wedge formation as at 58, 59 and 60 for section 54 and 61, 62 and 63 for section 55. These sections each have inwardly extending flanges 64 and 65 which are spaced providing a slot 66 extending throughout their length.

Springs 71 and 72 of the leaf type are positioned between the shoulders 73 on the side sections and 74 on the intermediate section on one side and 75 and 76 on the other side so as to urge the center section outwardly and the side sections inwardly whereby the tapers or inclines will cause the side sections to expand and tightly engage the walls of the slot 50 in which they are located. The ends of the gate extend into and are guided by slots in the rotor end walls 24 and 25 as at 78 and 79 (FIG. 5). The gate being made as above enables it to: expand for a tight seal in its slot, to contract for free movement in and out, and to compensate for expansion and contraction due to heat. The two outer sections conform to the wedge shape on the inside and to the wedge shape of the inner section but also have additional clearance top and bottom to permit movement of the inner wedge section relative to the outer sections. It is this clearance top and bottom plus the degree of the angle of the wedge that determine the amount of expansion and contraction possible. The center section is connected to rods 80, 80' by threads 81 and acts through a sealer bushing 82 at the end of the slot 50 in a direction across the rotor. As seen in FIG. 2, there are two of these rods designated as 80 and 80'. These rods are duplicates and are located near each of the end walls of the rotor in a balanced relation. The rods 80 and 80' as seen more particularly in FIG. 7 are connected by a bar 85 which is equipped with rollers 86 at its ends to be guided in slots 87 in the opposite end walls 24 and 25 of the rotor. When the gate extends into the chamber activated by rods 80, 80' the two side sections 54 and 55 are pushed out ahead of the inner wedge section 70. Since there is little resistance, there is little relative movement between the sections so the side sections slide freely in the slot. When the side sections reach the outer casing 14 they stop. The center wedge section 70 continues to move causing the side sections 54 and 55 to expand by action of the wedges to a tight seal in the slot. In retracting, the wedge section 70 is pulled back first for the distance of the bottom clearance. This contracts the side sections enough for free movement and then the three sections are retracted together.

Springs 71 and 72 are used between the bottom of one set of wedges 74 and 76 and their corresponding shoulders 73 and 75. The purpose of this is to start the side walls moving back the instant they are free enough to move. This maintains contact with the side walls at all times and minimizes the possibility of carbon building up where the walls must seal. It also aids in cooling the walls because of positive contact with the sides 51 and 52 in the retracted position. Each time the gate retracts and extends it adjusts itself for expansion of the metal due to heat. In the hot condition the wedge section urged by the torsion spring 110 does not extend quite as far as when it is cold.

Figure 4:
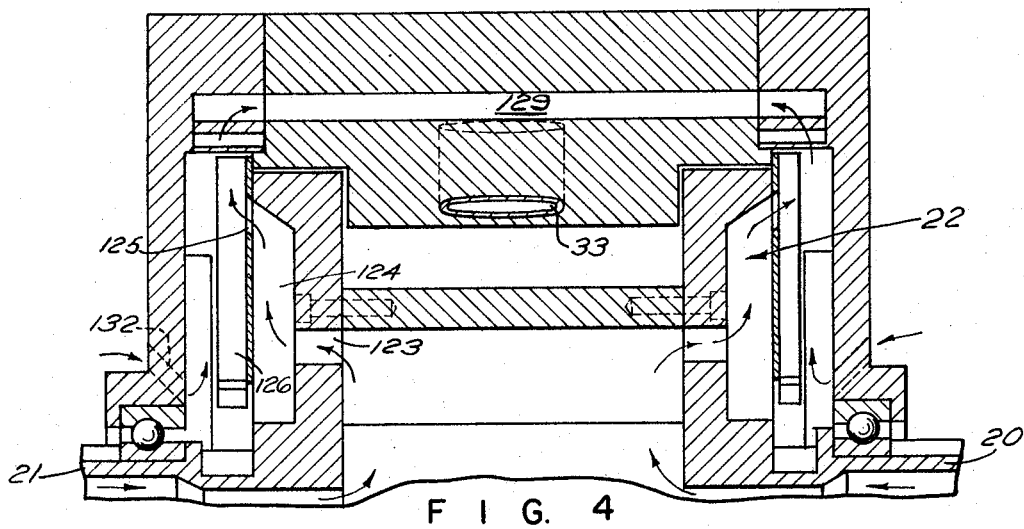
FIG. 4 is a section on line 4—4 of FIG. 3.
Figure 4A:
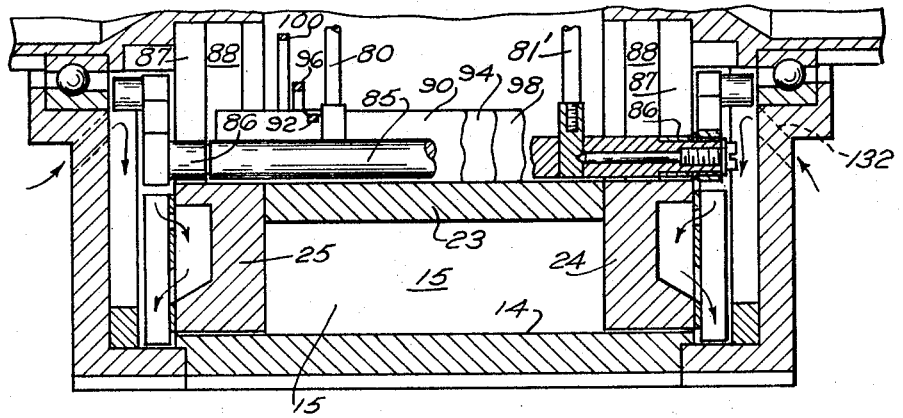
FIG. 4a is a section on line 4a—4a of FIG. 3.

In line with the guide slots 87 in the end walls of the rotor, there is a slot 88 (FIG. 4a) extending outwardly from the open center of the rotor and terminating short of the periphery thereof and it is into this slot that the rods 80 and 80' extend. In this slot 88 there are a plurality of sets of weights, here shown as consisting of three units nested together. The inner weight unit comprises a pair of plates 90 and 91 (FIG. 8) connected together by straps 92 and 93 at different elevations near the opposite ends of the plates. The next unit comprises plates 94 and 95 connected together by straps 96 and 97, while the outer unit comprises plates 98 and 99 connected together by straps 100 and 101. The straps for each of the plates, it will be noted, are at different elevations and the arrangement is such that as the bar 85 is moved outwardly to urge the gate 53 outwardly, it will first pick up one end of the innermost weight, then pick up the other end of the innermost weight, it then picks up the opposite end of the next weight and then the other end of that weight and so on until all of the weights are picked up, and when it is in its outermost position, such as shown in FIG. 1, all of the weights will have been picked up as demonstrated in FIG. 7 of the detailed view.

Centrifugal forces at high speed can reach large proportions. For this reason bar 85 is made of such a weight so as to balance the gate in the retracted position. Then as the gate is moved outwardly and the bar inwardly the bar picks up weights to compensate for these changes in distance from the axis of rotation. Mathematically it is expressed: Weight times lever arm length on the weight side equals weight of gate times lever arm length on the gate side. This balanced relationship is maintained throughout the extent of travel.

The outer ends of the bar 85 are connected to levers located in the spaces 28 and 29 between the ends of the rotor and the ends of the casing. The levers are designated as 105 (FIG. 1) and are mounted on the ends of shafts 106 which extend in an axial direction through the rotor and beyond the ends of the rotor on either end. The levers are connected to the ends of the bar 85 by the slot 107 in the enlarged portion 108 extending over the roller 109 on the ends of the bars. A coil torsion spring 110 (FIG. 2) about the shaft 106 serves to rotate this shaft so as to extend the bars 80, 80' and gate to their outer position. The other end of this lever 105 is equipped with a cam follower 112 which will engage the cam surface 113 of the cam 114 located along the path of movement of this lever in the spaces 28 and 29. The cam surface 113 will be so formed and located that as the gate approaches the exhaust opening 34, it will be retracted inwardly so as to just clear the cam surface 47 and clear the seals 36 and 37 on the divider 35, and then as the rotor moves further counterclockwise as shown in FIG. 1, the cam surface 113 will permit the gate to move outwardly again under action of spring 110 close to but just clear of the cam surface 48 on the other side of the divider and adjacent the inlet opening 33. It will, of course, be apparent that as the cam moves the gate inwardly, the tension of spring 110 will be increased.

It will be pointed out that although the cam 114 causes a very short movement A of the lever arm inwardly, by reason of the location of the pivot, the distance B of the movement of the arm is multiplied or about three times the distance of the movement A of the arm inwardly; thus this arrangement is well adapted to high speed operation as the cam lever roll need depart from its circular orbit only a fraction of its effective movement. It is also pointed out that the drop of the cam for outward movement of the gate is much longer and more gradual than the rise of the cam 114 for inward movement of the gate as can be clearly seen in FIG. 1.

Figure 3:
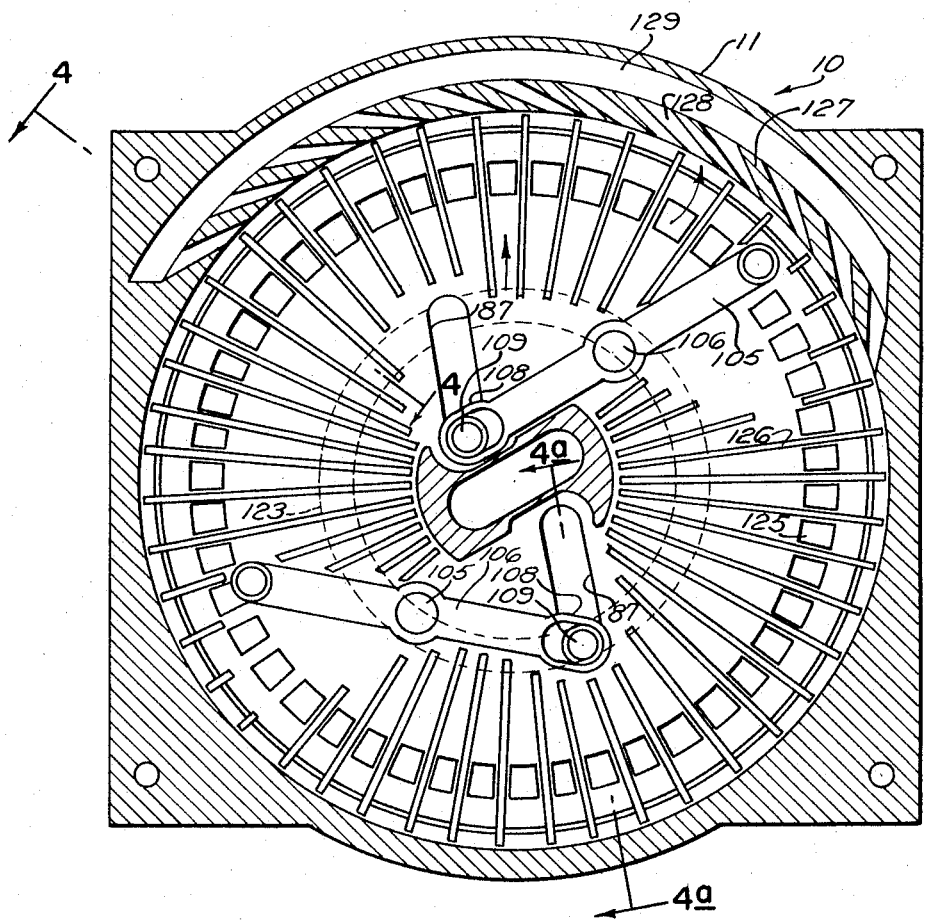
FIG. 3 is an end view with the end plate removed and substantially a section on line 3—3 of FIG. 2.

The compressor here described acts as a two stage compressor. The rotor is provided with a number of radiating slots extending from the hollow center 120 outwardly as at 121, thus providing a plurality of fins 122 that act like a centrifugal air pump. The spinning air in the slots 121 of the rotor becomes compressed and moves out through the side ports 123 (FIG. 3) through the internal side fins 124, through ports 125 to external side fins 126 and through diffusor 127 which has the effect of changing velocity into pressure, through channels 128 and 129 to intake port 33 where the second stage of compression commences. This intake causes a partial vacuum at the center axis and air will rush in through the hollow shaft 21; thus the moving air over the many surfaces at high velocity picks up heat and carries it to the rotary chamber. This air travel will also cause air to enter through ports 132 in the end wall of the casing.

This engine acting as a compressor will be driven by the sprocket 130 on the shaft 21 which will cause rotation of the rotor 23 in a counterclockwise direction as indicated by the arrow 131, FIG. 1. As seen in FIG. 1, the uppermost gate 53 will then move out from the divider across the intake opening 33, and by reason of its movement will suck air in through the intake opening forcing what air there is ahead of it around the annular passage 15, and at the same time the gate shown in the position of six o'clock will be moving up to the output opening 34, moving what air there is ahead of it toward the dividing wall 35. This second gate retracts under the dividing wall and extends into the chamber on the intake side of the dividing wall, and likewise as each gate reaches the dividing wall, it retracts and goes under the dividing wall and in so doing releases the air in front of it and it feeds back toward the intake port, but the second gate is blocking the way and so it cannot be lost. The second gate now compresses the 180° of chamber volume that the first gate released plus the 180° of chamber volume of its own so that in one revolution 360° of chamber volume has been sucked into the chamber and compressed. As the rotor continues to rotate, pressure is built up within the compressor, the piping and the valves.

As the gate extends into the chamber after going under the dividing wall, air enters through slot 66 of the gate and moves down the two sides of the gate wedge section 70 which is purposely made smaller in length than the two sides 54 and 55 to the gate chamber beneath. When the gate retracts this air is forced out in the reverse order; thus the gate chamber area acts to increase the capacity of the compressor to a full 360° of chamber 15 area.

Some leakage over the top of the gate is unavoidable and this will tend to retract the gate prematurely. To counteract this, pressure is allowed to build up in the gate chamber 50. This pressure enters through hole 135, travels along the wedge clearance and down the sides of section 70. This pressure is not a loss as it is expelled back into the chamber 15 as the gate retracts.

Most positive displacement compressors are limited for their maximum compression ratio on the relationship of the clearance space to the area swept by the piston. The above described mechanism is not. It has a relatively large clearance space, i.e. the area swept by the retracting gate, but since almost an infinite amount of air can be added on repeated revolutions, for practical applications at least, it can be thought of as having no clearance space and the compression ratio will depend on the relationship of the input area to the output area, the output area being outside the compressor.

Thus it can be seen that this is a very versatile compressor. It can be used for anything from merely pumping air at atmospheric pressure to the equivalent of a multi-stage compressor merely by changing the output area.

The rotary chamber mechanism above described for a compressor may have the rotary chamber and gate used in a combustor with the same advantages as above pointed out. In a combustor there could be one or more gates spaced according to the firing impulses desired as efficiency dictated. Should there be three gates used and such firing be every 120° there would be 240° allowed for cooling the gates.

I claim:
1. In a rotary mechanism of the type described, a rotor having a body, a guide slot in said body with side walls extending generally axially and outwardly of the axis of rotation of the rotor, a gate in said slot and means to move said gate inwardly and outwardly of said slot, said gate comprising relatively expandible parts engaging said side walls and means to move said parts toward and away from said side walls to effect an expanding and contracting relation of said gate.

2. In a rotary mechanism as in claim 1 wherein said parts have inner surfaces inclined to said walls in echelon relation and providing shoulders between said inclined walls and said means is a member having a multiple wedge shape engaging said inclined surfaces and with shoulders between said surfaces for expanding said parts against said side walls as moved outwardly to effect a sealing relation and for engagement of said shoulders upon an inward movement to remove said sealing relation.

3. In a rotary mechanism as in claim 1 wherein the part on the leading side of said gate has a hole therethrough connecting the space between said parts with the gas compressed ahead of said gate to assist in moving said parts against the side walls of said slot.

4. In a rotary mechanism as in claim 1 wherein the part on the leading side of said gate has a hole therethrough connecting the space between said parts with the gas compresed ahead of said gate to assist in counteracting the gas compressed ahead of the gate from moving the gate inwardly.

5. In a rotary mechanism of the type described, a rotor having a body, a guide slot in said body having side walls extending generally axially and outwardly of the axis of rotation of the rotor, a gate in said slot and means to move said gate inwardly and outwardly of said slot wherein said means to move said gate extends on the other side of the axis of rotation of said rotor and progressively picks up weighting means on the side of the axis opposite said gate to balance the gate as it is extended away from said axis.

6. In a rotary mechanism as in claim 5 wherein said means to move said parts extends on the other side of the axis of rotation of said rotor and progressively picks up weighting means on the side of the axis opposite said parts to balance the gate as it is extended radially away from said axis.

7. In a rotary mechanism as in claim 5 wherein the means to balance said gate comprises a rod extending on the other side of the axis of rotation of said rotor, a slot in said rotor and a series of weights in said slot, cooperating means between said rod and weights for progressively picking up said weights by said rod as it moves said gate parts outwardly.

8. In a rotary mechanism as in claim 5 wherein the means to balance said parts comprises a rod extending on the other side of the axis of rotation of said rotor, a slot in said rotor and a series of weights in said slot, cooperating means between said rod and weights for progressively picking up said weights by said rod as it moves said gate parts outwardly.

9. In a rotary mechanism of the type described, a casing, a rotor in said casing having a body with radially extending end walls providing with said casing a generally annular chamber, a gate on said rotor extending into said chamber, a dividing wall on said casing extending into said chamber beneath which said gate passes, and spring pressed sealers set into said dividing wall and engaging said end walls of the rotor said sealers being of a shape to extend along the end wall of the rotor and over its axially inner circumferential edge.

References Cited by the Examiner

UNITED STATES PATENTS

| | | | |
|---|---|---|---|
| 723,656 | 3/1903 | Dunn | 103—137 |
| 798,485 | 8/1905 | Augustine | 103—136 |
| 1,644,490 | 10/1927 | Post | 123—16 |
| 2,048,825 | 7/1936 | Smelser | 123—16 |
| 2,245,498 | 6/1941 | Pringiers | 103—144 |
| 2,302,254 | 11/1942 | Rhine | 123—16 |
| 2,382,259 | 8/1945 | Rohr | 123—16 |
| 2,588,342 | 3/1952 | Bidwell | 103—136 |
| 3,128,708 | 4/1964 | Henning | 103—5 |

DONLEY J. STOCKING, *Primary Examiner.*

SAMUEL LEVINE, MARK NEWMAN, *Examiners.*

R. M. VARGO, W. J. GOODLIN, *Assistant Examiners.*